United States Patent
Ganusov et al.

(10) Patent No.: US 10,230,374 B1
(45) Date of Patent: Mar. 12, 2019

(54) METHODS AND CIRCUITS FOR PREVENTING HOLD VIOLATIONS

(71) Applicant: Xilinx, Inc., San Jose, CA (US)

(72) Inventors: Ilya K. Ganusov, San Jose, CA (US); Benjamin S. Devlin, New York, NY (US)

(73) Assignee: XILINX, INC., San Jose, CA (US)

( * ) Notice: Subject to any disclaimer, the term of this patent is extended or adjusted under 35 U.S.C. 154(b) by 15 days.

(21) Appl. No.: 15/267,572

(22) Filed: Sep. 16, 2016

(51) Int. Cl.
*H03K 19/177* (2006.01)
*H03K 3/037* (2006.01)
*G06F 17/50* (2006.01)

(52) U.S. Cl.
CPC ..... *H03K 19/1776* (2013.01); *G06F 17/5072* (2013.01); *G06F 17/5077* (2013.01); *H03K 3/0372* (2013.01); *H03K 19/17728* (2013.01)

(58) Field of Classification Search
CPC ........ G06F 1/12; G06F 1/3243; G06F 1/3296; G06F 13/423; G06F 17/505; G06F 17/5054; G06F 9/00; G06F 9/3869; G01R 31/317; H03K 19/096; H03K 19/1733; H03K 19/20; H03K 3/0375; H03L 7/00; H03L 7/085; H03L 7/0012; H03L 7/02
See application file for complete search history.

(56) References Cited

U.S. PATENT DOCUMENTS

| | | | | |
|---|---|---|---|---|
| 7,346,861 B1 * | 3/2008 | Lee | ...................... | G06F 17/5054 326/95 |
| 2009/0243687 A1 * | 10/2009 | Lewis | .................. | H03K 3/0375 327/224 |
| 2014/0253175 A1 * | 9/2014 | Dally | ................... | H03K 19/096 326/93 |

OTHER PUBLICATIONS

Jan M. Rabaey, et al, Digital Integrated Circuits, A Design Perspective, 2nd Ed. 2003, pp. 334, 344, and 347, Figures 7-10, 7-23, 7-26.*
U.S. Appl. No. 15/234,640, filed Aug. 11, 2016, Ganusov, Iya K. et al., Xilinx, Inc., San Jose, CA USA.
Ganusov, Ilya et al., "Time-borrowing platform in the Xilinx UltraScale+ family of FPGAs and MPSoCs", 9 pp.; Proceedings of the 26th International Conference on Field-Programmable Logic and Applications, SwissTech Convention Center, Lausanne, Switzerland, Aug. 29-Sep. 2, 2016, 9 pp.

* cited by examiner

*Primary Examiner* — Seokjin Kim
(74) *Attorney, Agent, or Firm* — LeRoy D. Maunu (57) ABSTRACT

Aspects of various embodiments of the present disclosure are directed to methods and circuits preventing hold violations in clock synchronized circuits. In an example implementation, a circuit includes a logic circuit having a set of inputs. Signal propagation time on a signal path to at least one of the set of inputs presents a hold violation. The circuit includes first and second level-sensitive latches. The first level-sensitive latch has an output connected to the one of the plurality of inputs. The second level-sensitive latch has an input connected to an output of the logic circuit. A latch control circuit is configured to remove the hold violation on the input by providing a pulsed clock signal to a clock input of the second level-sensitive latch and an inversion of the pulsed clock signal to a clock input of the first level-sensitive latch.

16 Claims, 7 Drawing Sheets

METHODS AND CIRCUITS FOR PREVENTING HOLD VIOLATIONS

FIELD OF THE INVENTION

The disclosure generally relates to electronic circuits, and more particularly to methods and structures for preventing hold time violations in electronic circuits.

BACKGROUND

Modern digital circuits, whether implemented in integrated circuits (IC) or in discrete form, often utilize latches to synchronize propagation of data signals. One type of latch, referred to as a level-sensitive latch, provides an output signal having a state that depends upon the activity of the clock signal that is present at a clock input node. In particular, the logic value of the output signal of the level-sensitive latch reflects the logic value of the signal at the input node during a portion of the input clock cycle. In this phase of operation, the latch passes a logic value present at its input node directly to its output node. A latch operating in this phase may be referred to as being transparent. In a second phase of operation, the level-sensitive latch maintains the output signal at a fixed logic value during the remaining portion of the input clock cycle, regardless of the logic value present at the input node. A latch operating in the second phase may be referred to as being latched or held.

Another type of latch, referred to as a flip flop or edge-triggered latch, is configured to set and hold an output signal to a logic value present at an input node during an edge of a clock signal provided to a clock input node. One implementation of a flip flop includes a combination of two level-sensitive latches. The first level-sensitive latch, i.e., the master stage, is transparent during a first phase of the input clock, while the second level-sensitive latch, i.e., the slave stage, is transparent during a second phase of the input clock. The combined behavior is such that the input data is captured and passed to the output node only when the clock signal exhibits a low-to-high logic transition. The value of the output signal is maintained until the next low-to-high transition of the clock signal. Conversely, the configuration of the two level-sensitive latches may be altered to capture input data during a high-to-low logic transition of the clock signal.

SUMMARY

Various example implementations are directed to circuits and methods for preventing hold violations in clock synchronized circuits. In an example implementation, a circuit includes a logic circuit having a set of inputs. Signal propagation time on a signal path to at least one of the set of inputs presents a hold violation. The circuit includes first and second level-sensitive latches. The first level-sensitive latch has an output connected to the one of the plurality of inputs. The second level-sensitive latch has an input connected to an output of the logic circuit. A latch control circuit is configured to remove the hold violation on the input by providing a pulsed clock signal to a clock input of the second level-sensitive latch and an inversion of the pulsed clock signal to a clock input of the first level-sensitive latch.

In another example implementation, a circuit includes a plurality of configurable routing resources and a plurality of configurable logic blocks. Each configurable logic block includes a logic circuit having one or more inputs. For each of the one or more inputs, the configurable logic block includes a respective level-sensitive latch circuit having an output connected to the input of the logic circuit and an input connected to the plurality of configurable routing resources. The configurable logic block also includes a configurable latching circuit having an input connected to an output of the logic circuit. The configurable latching circuit is configured to operate as a flip flop in a first mode and operate as a level-sensitive latch in a second mode. A latch control circuit is configured to remove a hold violation on at least one input of the logic circuit of one of the plurality of configurable logic blocks. The hold violation is removed by enabling latching of, and providing a pulsed clock signal to, the level-sensitive latch connected to the input subject to the hold violation, configuring the configurable latching circuit of the configurable logic block to operate in the second mode, and providing an inversion of the pulsed clock signal to the configurable latching circuit.

In another embodiment, a method is provided for placement and routing of a circuit design. A placed-and-routed circuit design is generated by determining a placement for circuit elements of the circuit design and determining a set of routes between the circuit elements for connections specified in the circuit design. Timing of the determined set of routes is evaluated to identify routes that present a timing violation to a flip flop in the placed-and-routed circuit design. In response to identifying a route presenting a timing violation for the flip flop, the flip flop in the placed-and-routed design is replaced with a first level-sensitive latch having a clock node connected to receive a pulsed clock signal. In further response to identifying a route presenting a timing violation, clocking of a level-sensitive latch connected in the route with an inversion of the pulsed clock signal is enabled.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

One consideration in the design of electronic circuits is setup and hold times. The setup time for a clocked circuit element (e.g., a flip flop, a latch, a register, a lookup table in RAM mode or shift register mode, or other clocked element) is the minimum length of time that a data signal must be available and stable at an input terminal of the circuit element before a leading edge of a clock pulse is applied to a clock input terminal of the circuit element. If the clock pulse is applied too soon after the data signal, the setup time will be violated (less than the minimum length of time) and the clocked element may output an incorrect signal. Hold time for the clocked circuit element is the minimum amount of time a data signal must be stable following the leading clock edge at a clock input terminal. If an input signal is not held stable at the input for the required time following the leading clock edge, the hold time will be violated. If either a set-up or hold time requirement is violated, the circuit may not operate correctly.

Some design approaches remove hold violations by rerouting a signal path to increase the time needed to propagate the signals to the input terminals subject to the hold violations. However, rerouting signal paths can be difficult in congested areas where area and/or routing resources may be limited. Methods and circuits are disclosed for removing hold violations without rerouting signal paths.

In an example implementation, a hold violation in a fan-in cone of a flip-flop of a circuit may be removed by splitting the master and slave level-sensitive latches and relocating the master level-sensitive latch to a location in the logic circuit that precedes the flip-flop in the signal path causing the hold violation. The slave level-sensitive latch is clocked by a pulsed clock signal and the master level-sensitive latch is clocked by an inversion of pulsed clock signal. Placement of the master level-sensitive latch before the logic circuit and clocking with pulsed clock signals allows the signal to be latched earlier and presented to the input of the logic circuit at a later time. In this manner, the hold violation is prevented.

Figure 1:
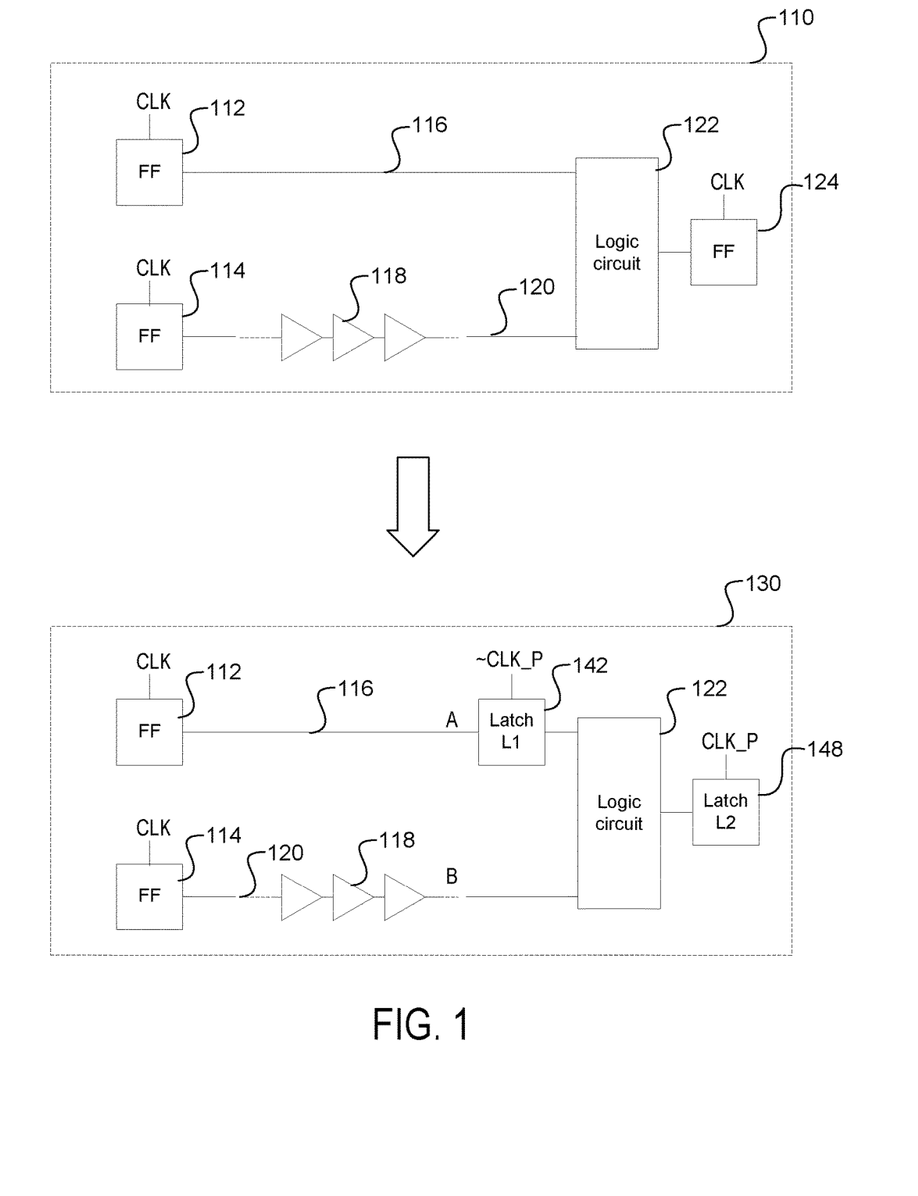
FIG. 1 shows a diagram of an example circuit configured to prevent hold violations, consistent with one or more implementations.

Turning now to the figures, FIG. 1 illustrates use of pulsed latches in an example circuit to prevent hold violations. Block 110 shows an example circuit having a hold violation. The circuit includes two source flip flops 112 and 114 that are synchronized by a clock signal CLK and that generate input signals to a logic circuit 122. The output of the logic circuit is sampled and latched in flip flop 124 according to CLK. To ensure correct operation, the signals generated by source flip flops 112 and 114 must both be present on the inputs for sufficient time so the logic circuit will output a signal with the correct value that satisfies the setup and hold time requirements of the destination flip flop 124. In this example, the signal path 120 between flip flop 114 and the logic circuit includes a number of logic circuits 118, which cause propagation time of the signal path 120 to be greater than the propagation time of the signal path 116 from flip flop 112 to logic circuit 122. The length of the delay in signal path 120 may introduce a setup violation if the delay is too large. If the delay on path 116 is much smaller than the clock skew between the clock pins on flip-flop 112 and flip-flop 124, a hold violation may result.

Block 130 shows a circuit similar to that of block 110 adapted to prevent timing violations using pulsed latches. The circuit in block 130 includes a logic circuit 122, source flip flops 112 and 114, and signal paths 116 and 120 arranged as described with reference to the circuit of block 110. In comparison to the circuit in block 110, a first pulsed latch is created when the destination flip-flop 124 is replaced with pulsed latch 148 to improve the setup path between source flip-flop 114 and destination flip-flop 122 due to time borrowing. A master latch 142 can be instantiated in signal path 116 if changing flip-flop 124 to a latch 148 created a hold violation in signal path 116 and no hold violation was present before the change. In this arrangement, the destination flip-flop 124 is essentially split into master and slave level-sensitive latches 142 and 148 with the master level-sensitive latch 142 being placed in the signal path 116 presenting the hold violation. The slave level-sensitive latch 148 is clocked with a pulsed clock signal CLK_P by a latch control circuit (not shown). The master level-sensitive latch 142 is clocked by an inversion of pulsed clock signal CLK_P, which is shown as ~CLK_P, by the latch control circuit. By moving the master latch stage onto the path 116 that doesn't need the benefits of a latch and letting the path 120 with a long delay have only a latch, most of the benefits of time borrowing can be attained.

For ease of reference, a path having a longest propagation time to the logic circuit may be referred to as a setup path. A signal path having the least propagation time to the logic circuit, and which may present a hold violation, may be referred to as a hold path.

Figure 2:
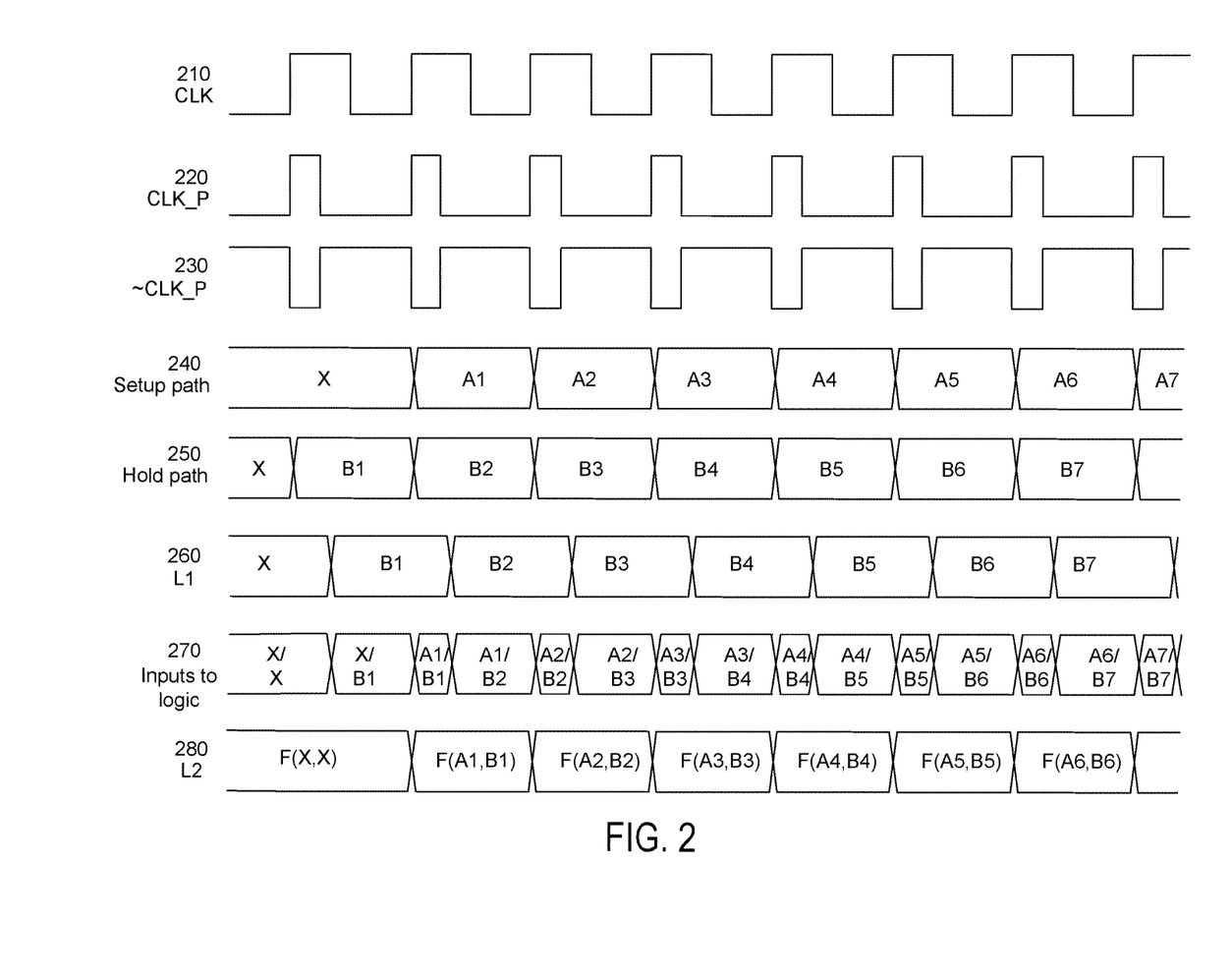
FIG. 2 shows waveforms for an example set of signals generated during operation of the circuit shown in FIG. 1, consistent with one or more implementations.

FIG. 2 shows waveforms for an example set of signals generated during operation of the circuit shown in FIG. 1, consistent with one or more implementations. Waveform 210 shows an example clock CLK used for clocking of flip flops 112, 114, and 124 in the circuits shown in FIG. 1. Waveform 220 shows a pulsed clock signal CLK_P used to clock the level-sensitive latch 148. The pulsed clock signal CLK_P has a rising edge aligned with a rising edge of the clock signal CLK and falling edge that is earlier than a falling edge of the clock signal CLK. Waveform 230 shows an inverted pulsed clock signal ~CLK_P used to clock the level-sensitive latch 142.

Waveform 240 shows signal values on the setup path to the logic circuit during operation. Waveform 250 shows signal values on the hold path to the logic circuit during operation. Waveforms 240 and 250 are labeled to indicate the respective clock cycle in which each portion of the signals are transmitted on the setup and hold paths (e.g., by source flip flops 112 and 114). For instance, A1 and B1 indicate the signals transmitted in a first clock cycle and A2 and B2 indicate the signals transmitted in a second clock cycle. In this example, the propagation time of the setup path is approximately one clock cycle longer than the propagation time of the hold path. As a result, the hold path signal B1 is no longer available when the setup path signal is received A1 and the logic circuit cannot output the correct value.

Waveform 260 ("L1") shows the signal output by the master level-sensitive latch 142. The level-sensitive latch is transparent when ~CLK_P is high and is latched when ~CLK_P is low. The clocking of the master level-sensitive latch with the ~CLK_P delays the hold path signal by a fraction of one clock cycle.

The waveform 270 shows the combinations of signals input to the logic circuit. As shown in the waveform 270, the delaying of the hold path signal causes the correct combinations of values (e.g., A1 and B1) to be presented concurrently to the logic circuit for at least a portion of the clock cycle. Waveform 280 ("L2") shows the signal value output by the slave level-sensitive latch 148. The clocking of the slave level-sensitive latch 148 causes the level-sensitive latch to sample and hold the value output by the logic circuit while the correct combination of inputs are present at the inputs. In this manner, the hold violation is prevented.

The amount of time that the hold path is delayed depends on the duration of the pulses in the pulsed clock signals (i.e., the portion in which CLK_P is set to a high value and ~CLK_P is set to a low value). In the example shown in FIG. 2, the pulses are approximately ½ of one cycle of the clock signal CLK. Different implementations may use pulsed clock signals having longer or shorter pulses depending on the propagation delay difference between the setup and hold paths.

Figure 3:
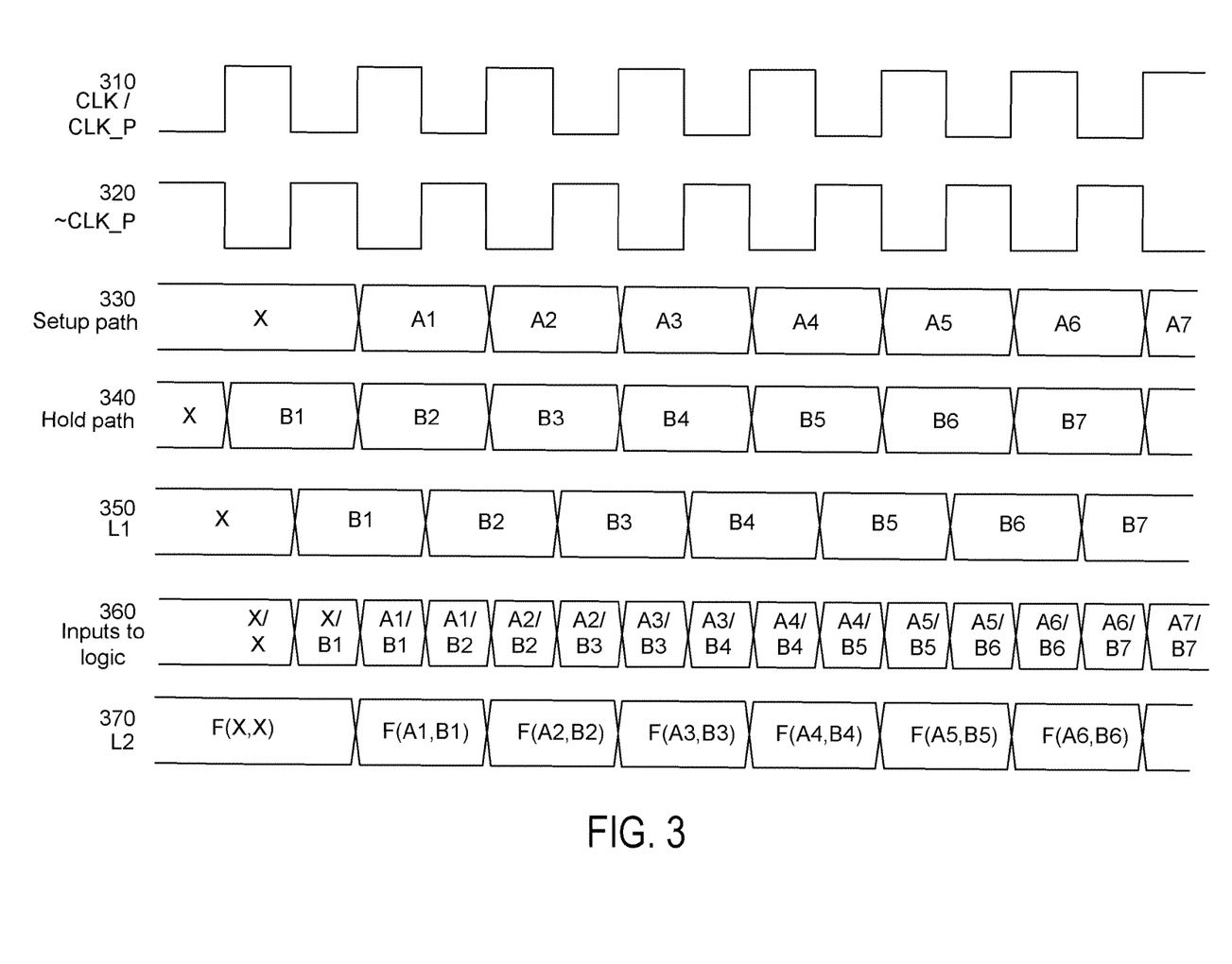
FIG. 3 shows waveforms for an example set of signals generated during operation of the circuit shown in FIG. 1, consistent with one or more implementations.

FIG. 3 shows waveforms for an example set of signals generated during operation of the circuit shown in FIG. 1 using pulsed clock signals having pulse widths that are ½ of a cycle of the CLK. Waveform 310 shows an example clock CLK used for clocking of flip flops 112, 114, and 124 in the circuits shown in FIG. 1. In this example, CLK is the same as the pulsed clock signal CLK_P used to clock the level-sensitive latch 148. Waveform 320 shows an inverted pulsed clock signal ~CLK_P used to clock the level-sensitive latch 142. Waveforms 330 and 340 show signal values on the setup and hold paths during operation.

Waveform 350 shows the signal output by the master level-sensitive latch 142. As described with reference to FIG. 2, the clocking of the master level-sensitive latch with the ~CLK_P delays the hold path signal by a period of time equal to the pulse width of the CLK_P. The waveform 360 shows the combinations of signals input to the logic circuit. In comparison to the waveforms in FIG. 2, the larger pulse width of CLK_P in FIG. 3 increases the period of time in which the correct combination of signals is input to the logic circuit. Waveform 370 shows the signal value output by the slave level-sensitive latch 148. The clocking of the slave level-sensitive latch 148 causes the level-sensitive latch to sample and hold the value output by the logic circuit when the output is valid (i.e., when the correct combination of inputs are present at the inputs at the logic circuit).

Figure 4:
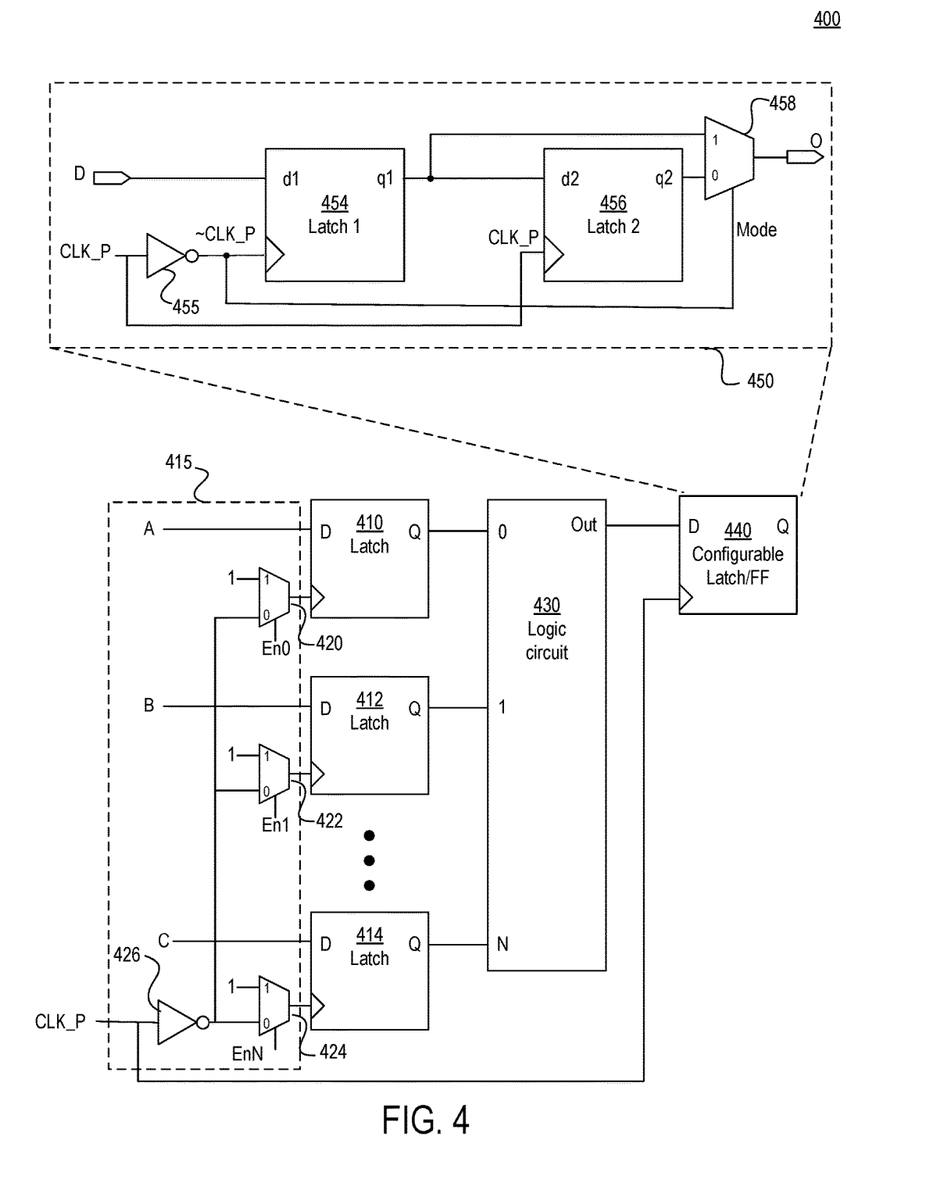
FIG. 4 shows a diagram of an example logic circuit with circuitry for removal of hold violations on any of a plurality of inputs to the logic circuit, consistent with one or more implementations.

FIG. 4 shows a diagram of an example configurable logic circuit with circuitry for selective removal of hold violations on any of a plurality inputs to a logic circuit, consistent with one or more implementations. The circuit 400 includes a logic circuit 430 having N input terminals and an output terminal. In different implementations, the logic circuit may perform various logic functions using data signals provided to the inputs. In some implementations, the logic circuit may be programmable (e.g., by a control signal provided to a control input) to select between a plurality of different functions. The logic functions may include, for example, input/output blocks (IOBs), dedicated random access memory blocks (BRAM), multipliers, digital signal processing blocks (DSPs), processors, clock managers, delay lock loops (DLLs), bus or network interfaces.

For each of the N input terminals of the logic circuit 430, the circuit 400 includes a respective level-sensitive latch 410, 412, or 414 in a signal path to the input terminal. Latching of each latch with a pulsed clock signal is selectively enabled or disabled by a latch control circuit 415, which includes a respective multiplexer 420, 422, or 424 according to a respective control signal En0, En1, or EnN. Inverter 426 generates an inverted pulsed clock signal ~CLK_P for clocking of level-sensitive latches 410, 412, and 414. The latching of a latch (e.g., 410) is enabled by setting the respective control signal (e.g., En0) to cause the respective multiplexer (e.g., 420) to provide an inverted pulsed clock signal ~CLK_P to a clock input of the latch. The latching of the latch is disabled by setting the respective control signal to cause the respective multiplexer to set the clock input to a constant logic 1 and thereby place the level-sensitive latch in a transparent state.

The circuit 400 also includes a configurable latching circuit 440 having an input connected to an output of the logic circuit 430. The configurable latching circuit 440 is configured to operate as a flip flop in a first mode and operate as a level-sensitive latch in a second mode. Block 450 shows an example implementation of the configurable latch circuit 440. In this example, the configurable latch circuit includes a first level-sensitive latch 454 (the master latch) having an input d1 connected to input node D and a second level-sensitive latch 456 (the slave latch) having an output q2 connected to output node Q. The pulsed clock signal CLK_P is provided to the clock input node of the second level-sensitive latch 456, and inverter 455 provides inverted pulsed clock signal ~CLK_P to the clock input node of the first level-sensitive latch 454. Multiplexer 458 can be controlled by the inverted clock signal ~CLK_P to select between the q1 output of latch 454 and the q2 output of latch 456. In a first mode, which is controlled by the state of signal ~CLK_P, multiplexer 458 connects an output of the first level-sensitive latch 454 to the output node O, and the configurable latch operates as a flip flop. In a second mode, the multiplexer 458 connects the input of the second level-sensitive latch to the output node O, and the configurable latch operates as a level-sensitive latch. In an alternative implementation, the flip flop functionality could be eliminated in the configurable latch/FF 440 in order to save circuit area, as a flip flop can be created by enabling all input latches as well as the output latch.

For a hold violation introduced by configuring the configurable latch/flip-flop 440 to operate as a latch, the circuit 400 may be configured to remove hold violations on any of the N inputs to the logic circuit 430 by setting the control signals mode, En0, En1, and EnN. The control signals En0, En1, or EnN are set to provide an inverted pulsed clock signal ~CLK_P to a clock input of the latches connected in signal paths causing hold violations. The control signals En0, En1, or EnN for other level-sensitive latches are set to cause a logic 1 to be provided to the other level-sensitive latches to hold the level-sensitive latches in a transparent state. If there is a hold violation on any of the inputs of the logic circuit, the mode control signal is set to logic 1 to operate the configurable latch circuit as a level-sensitive latch. Otherwise, the mode control signal is set to logic 0 to operate the configurable latch circuit as a flip flop. The mode control signal may be generated, for example, by performing a logical NAND of the control signals En0, En1, and EnN.

The circuits and methods may be adapted for avoiding hold violations in a number of applications. The circuits and methods are thought to be particularly applicable for use in integrated circuits (ICs) including programmable circuitry (e.g., programmable ICs or System-on-chips), which may be programmed for various circuit designs. The circuit arrangement 400 may be useful, for example, to enable easier removal of hold violations in IC including programmable circuitry (e.g., FPGAs or System-on-chips). For example, a programmable IC may include a plurality of configurable logic blocks having circuit arrangements similar to the circuit 400 shown in FIG. 4 and a set of programmable routing resources providing programmable signal paths between input/output terminals of the configurable logic blocks.

The programmable routing resources and configurable logic blocks are typically programmed by a configuration circuit (not shown), which loads a set of configuration data into internal configuration memory cells that define how the programmable elements are configured. The configuration data can be read from memory (e.g., from an external PROM) or written into the FPGA by an external device. The collective states of the individual memory cells then determine the operation of the routing resources and configurable logic blocks. The set of configuration data used to program configurable logic blocks and programmable routing resources may also configure the latching circuits 410, 412, 414, and 440 to remove hold violations.

Figure 5:
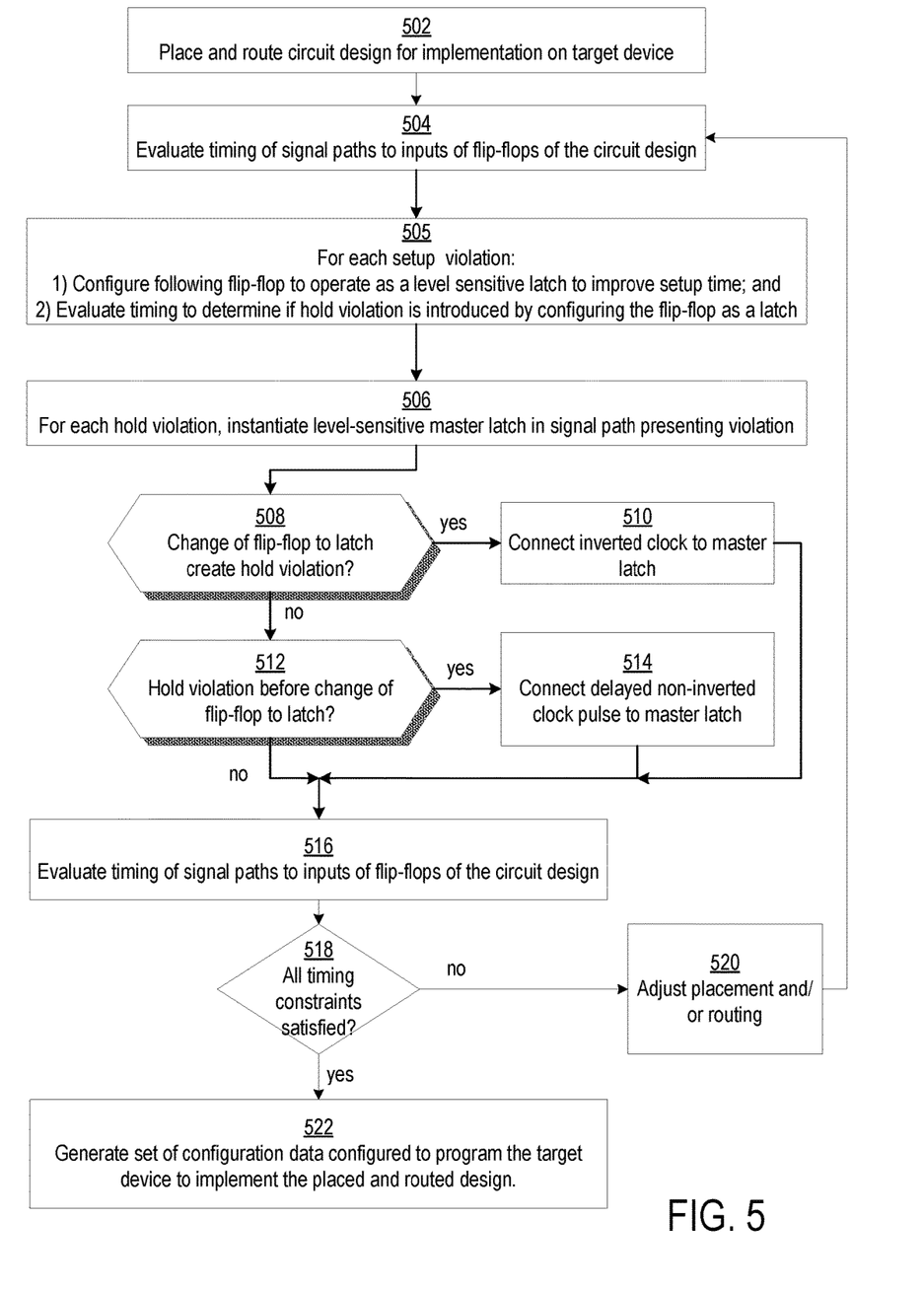
FIG. 5 shows an example process for removing hold violations in a circuit design, consistent with one or more implementations.

FIG. 5 shows an example process for identification and removal of hold violations in a circuit design, consistent with one or more implementations. At block 502, the circuit design is placed and routed for implementation on a target integrated circuit. At block 504, timing of signal paths to inputs of flip flops of the circuit design is evaluated to identify timing violations (e.g., by simulating the placed and routed circuit design). For each identified setup violation, the configurable latching circuit connected to the output of the logic circuit is configured at block 505 to operate as a single level-sensitive latch rather than a flip flop and thereby improve setup time. Also at block 505, timing is evaluated to determine whether configuration of the configurable latching circuit as a level-sensitive latch introduced a new hold violation. For each identified hold violation, at block 506 a level-sensitive latch is instantiated ("master latch") in the signal path presenting the hold violation if such a latch is not present. If prior to the change of the flip-flop to a level-sensitive latch, there was not a hold violation on the path and the change of the flip-flop to the latch introduced a hold violation, decision block 508 directs the process to block 510 where the clock pin of the master latch is connected to the inverted clock signal (the non-inverted clock signal is connected to the configurable latching circuit, which is the slave latch). If the path on which the flip-flop was converted to a level-sensitive latch had a hold violation prior to the change of the flip-flop to the latch, decision block 512 directs the process to block 514. Because providing the inverted clock signal to the master latch will not resolve a pre-existing hold violation, the non-inverted clock pulse signal is delayed and connected the to the master latch.

In some rare instances, it may not be possible to correct all of the hold time violations using only the pulsed latches discussed above. At block 516, timing is reanalyzed to determine if all hold violations have been corrected. If all hold violations are not corrected, the process proceeds from decision block 518 to block 520. At block 520, placement and/or routing of the circuit design is modified in an attempt to improve timing. The process returns back to block 504, where timing is reevaluated. The process repeats in this manner until all hold violations have been corrected. Once all hold violations are corrected, the process proceeds to block 522. At block 522, a set of configuration data is generated and stored (e.g., in a nonvolatile memory connected to the target device). The configuration data is configured to program the target device to implement the placed and routed circuit design.

Figure 6:
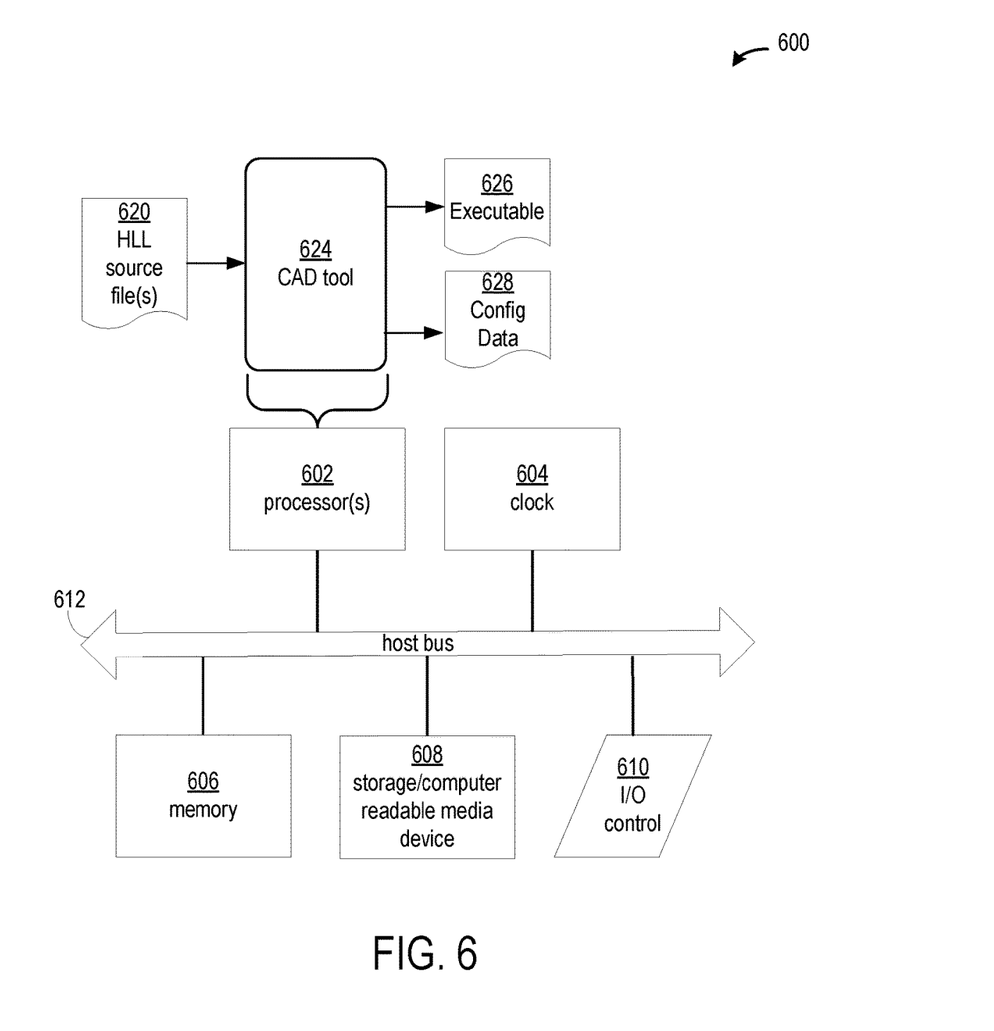
FIG. 6 shows an example computing system that may be used to adapt a circuit design to remove hold violations and configure a programmable IC to implement the resulting circuit design, consistent with one or more implementations.

FIG. 6 shows example computing system that may be used to adapt a circuit design to remove hold violations and configure a programmable IC to implement the resulting circuit design, consistent with one or more implementations. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.). The memory arrangement 606 typically includes multiple levels of cache memory, and a main memory. The memory arrangement 606 may include local and/or remote persistent storage, such as provided by magnetic disks (not shown), flash, EPROM, or other non-volatile data storage. The memory arrangement 606 may be read or read/write capable.

The processor(s) 602 executes the software in the memory arrangement 606, reads data from and stores data to the memory arrangement 606 and/or storage/computer readable media device 608, and communicates with external devices through the input/output control arrangement 610. These functions are synchronized by the clock signal generator 604. The resources of the computing arrangement may be managed by either an operating system (not shown), or a hardware control unit (not shown).

In some implementations, the memory arrangement 606 stores a set of instructions that, when executed, cause the processor 602 to provide a CAD tool 624. The CAD tool 624 may provide a GUI configured to aid in the design, simulation, testing, placement and routing, and/or hold time correction of system designs, for example, as described with reference to FIGS. 1-5.

In some implementations, the CAD tool 624 may be configured to automatically compile an HLL source file 620 for implementation of a system design on a SOC. The CAD tool 624 may be configured to identify and determine subsets of function calls to hardware accelerated functions for implementation in programmable logic resources of the SOC. The CAD tool 624 generates or retrieves a hardware description language (HDL) circuit design for implementation of the hardware accelerated functions.

The CAD tool 624 places and routes the HDL circuit design and removes hold violations, for example, as described with reference to the process shown in FIG. 5. The CAD tool 624 generates sets of programmable logic (PL) configuration data 628 for implementation of the resulting placed and routed circuit design. The CAD tool 624 may also supplement the HLL source file 620 with HLL code (e.g., interface code) to communicate data between HLL function calls and hardware accelerated functions implemented by the PL configuration data 628 The CAD tool compiles the supplemented HLL source file to produce an executable program 626 configured for execution on a processor of a SOC. The CAD tool 624 may package the executable 626 and PL configuration data 628 into one or more boot images for booting of the SOC.

Figure 7:
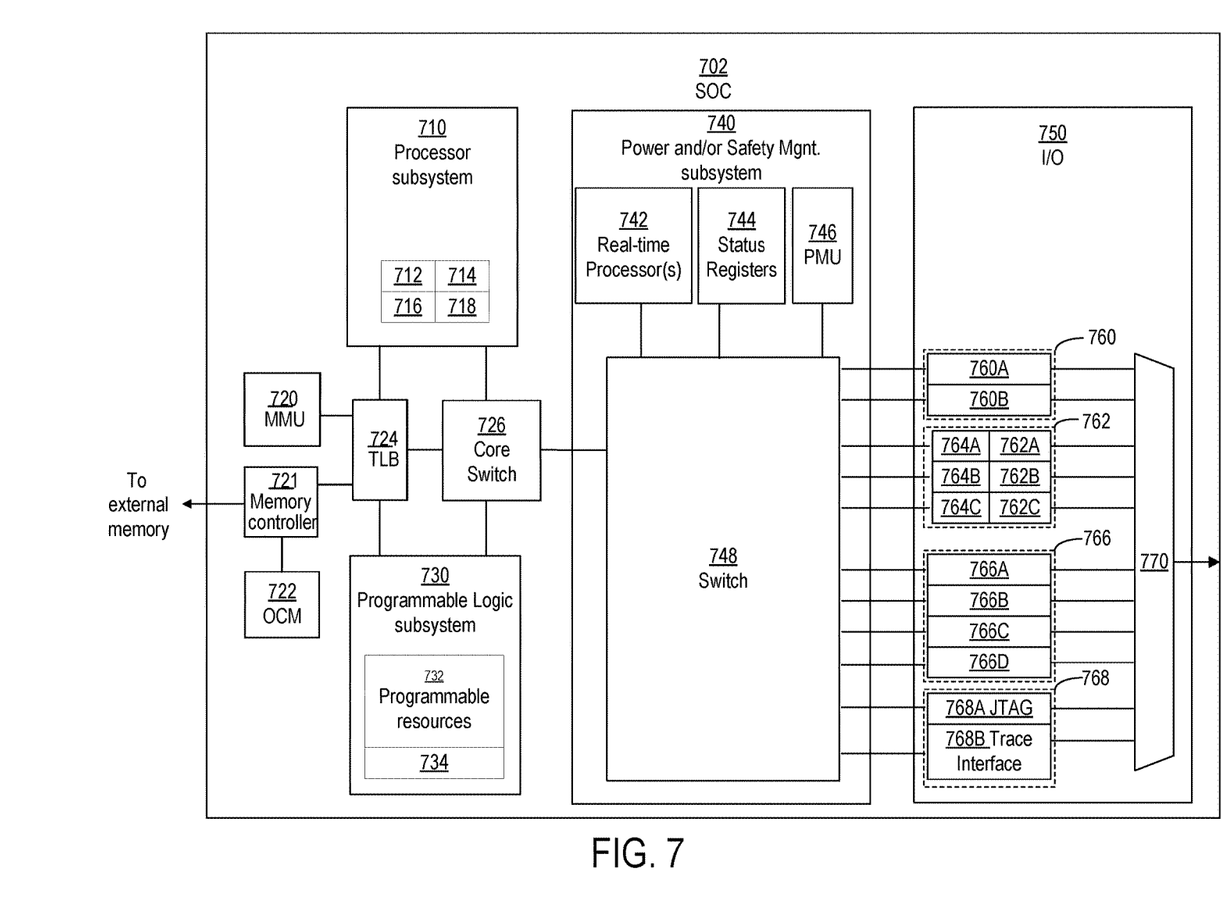
FIG. 7 shows an example programmable IC that may be adapted to include the disclosed configurable latch circuits, consistent with one or more implementations.

FIG. 7 shows an example programmable IC 702 that may be configured in accordance with one or more implementations. The programmable IC may also be referred to as a System On Chip (SOC), which includes a processor subsystem 710 and a programmable logic subsystem 730. The processor subsystem 710 may be programmed to implement a software portion of the user design, via execution of a user program. The program may be specified as part of a configuration data stream or may be retrieved from an on-chip or off-chip data storage device. The processor subsystem 710 may include various circuits 712, 714, 716, and 718 for executing one or more software programs. The circuits 712, 714, 716, and 718 may include, for example, one or more processor cores, floating point units (FPUs), an interrupt processing unit, on chip-memory, memory caches, and/or cache coherent interconnect.

The programmable logic subsystem 730 of the programmable IC 702 may be programmed to implement a hardware portion of a user design. For instance, the programmable logic subsystem may include a number of programmable resources 732, which may be programmed to implement a set of circuits specified in a configuration data stream. The programmable resources 732 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 732 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 732. The configuration data can be read from memory (e.g., from an external PROM) or written into the programmable IC 702 by an external device. In some implementations, a configuration controller 734 included in the programmable logic subsystem 730 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 710.

The programmable IC 702 may include various circuits to interconnect the processor subsystem 710 with circuitry implemented within the programmable logic subsystem 730. In this example, the programmable IC 702 includes a core switch 726 that can route data signals between various data ports of the processor subsystem 710 and the programmable logic subsystem 730. The core switch 726 may also route data signals between either of the programmable logic or processing subsystems 710 and 730 and various other circuits of the programmable IC, such as an internal data bus. Alternatively or additionally, the processor subsystem 710 may include an interface to directly connect with the programmable logic subsystem-bypassing the core switch 726. Such an interface may be implemented, for example, using the AMBA AXI Protocol Specification (AXI) as published by ARM.

In some implementations, the processor subsystem 710 and the programmable logic subsystem 730 may also read or write to memory locations of an on-chip memory 722 or off-chip memory (not shown) via memory controller 721. The memory controller 721 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 721 is able to communicate is provided for purposes of illustration only and is not intended as a limitation or to be exhaustive. As shown in FIG. 7, the programmable IC 702 may include a memory management unit 720 and translation look-aside buffer 724 to translate virtual memory addresses used by the subsystems 710 and 730 to physical memory addresses used by the memory controller 721 to access specific memory locations.

The programmable IC may include an input/output (I/O) subsystem 750 for communication of data with external circuits. The I/O subsystem 750 may include various types of I/O devices or interfaces including for example, flash memory type I/O devices, higher performance I/O devices, lower performance interfaces, debugging I/O devices, and/or RAM I/O devices.

The I/O subsystem 750 may include one or more flash memory interfaces 760 illustrated as 760A and 760B. For example, one or more of flash memory interfaces 760 can be implemented as a Quad-Serial Peripheral Interface (QSPI) configured for 4-bit communication. One or more of flash memory interfaces 760 can be implemented as a parallel 8-bit NOR/SRAM type of interface. One or more of flash memory interfaces 760 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 750 can include one or more interfaces 762 providing a higher level of performance than flash memory interfaces 760. Each of interfaces 762A-762C can be coupled to a DMA controller 764A-764C respectively. For example, one or more of interfaces 762 can be implemented as a Universal Serial Bus (USB) type of interface. One or more of interfaces 762 can be implemented as a gigabit Ethernet type of interface. One or more of interfaces 762 can be implemented as a Secure Digital (SD) type of interface.

The I/O subsystem 750 may also include one or more interfaces 766 such as interfaces 766A-766D that provide a lower level of performance than interfaces 762. For example, one or more of interfaces 766 can be implemented as a General Purpose I/O (GPIO) type of interface. One or more of interfaces 766 can be implemented as a Universal Asynchronous Receiver/Transmitter (UART) type of interface. One or more of interfaces 766 can be implemented in the form of a Serial Peripheral Interface (SPI) bus type of interface. One or more of interfaces 766 can be implemented in the form of a Controller-Area-Network (CAN) type of interface and/or an I²C type of interface. One or more of interfaces 766 also can be implemented in the form of a timer type of interface.

The I/O subsystem 750 can include one or more debug interfaces 768 such as processor JTAG (PJTAG) interface 768A and a trace interface 768B. PJTAG interface 768A can provide an external debug interface for the programmable IC 702. Trace interface 768B can provide a port to receive debug, e.g., trace, information from the processor subsystem 710 or the programmable logic subsystem 730.

As shown, each of interfaces 760, 762, 766, and 768 can be coupled to a multiplexer 770. Multiplexer 770 provides a plurality of outputs that can be directly routed or coupled to external pins of the programmable IC 702, e.g., balls of the package within which the programmable IC 702 is disposed. For example, I/O pins of programmable IC 702 can be shared among interfaces 760, 762, 766, and 768. A user can configure multiplexer 770, via a configuration data stream to select which of interfaces 760-768 are to be used and, therefore, coupled to I/O pins of programmable IC 702 via multiplexer 770. The I/O subsystem 750, may also include a fabric multiplexer I/O (FMIO) interface (not shown) to connect interfaces 762-768 to programmable logic circuits of the programmable logic subsystem. Additionally or alternatively, the programmable logic subsystem 730 can be configured to implement one or more I/O circuits within programmable logic. In some implementations, the programmable IC 702 may also include a subsystem 740 having various circuits for power and/or safety management. For example, the subsystem 740 may include a power management unit 746 configured to monitor and maintain one or more voltage domains used to power the various subsystems of the programmable IC 702. In some implementations, the power management unit 746 may disable power of individual subsystems, when idle, to reduce power consumption, without disabling power to subsystems in use.

The subsystem 740 may also include safety circuits to monitor the status of the subsystems to ensure correct operation. For instance, the subsystem 740 may include one or more real-time processors 742 configured to monitor the status of the various subsystems (e.g., as indicated in status registers 744). The real-time processors 742 may be configured to perform a number of tasks in response to detecting errors. For example, for some errors, the real-time processors 742 may generate an alert in response to detecting an error. As another example, the real-time processors 742 may reset a subsystem to attempt to restore the subsystem to correct operation. The subsystem 740 includes a switch network 748 that may be used to interconnect various subsystems. For example, the switch network 748 may be configured to connect the various subsystems 710, 730, and 740 to various interfaces of the I/O subsystem 750. In some applications, the switch network 748 may also be used to isolate the real-time processors 742 from the subsystems that are to be monitored. Such isolation may be required by certain application standards (e.g., IEC-61508 SIL3 or ISO-26262 standards) to ensure that the real-time processors 742 are not affected by errors that occur in other subsystems.

The methods and circuits are thought to be applicable to a variety of systems that utilize latching circuits. Other aspects and features will be apparent to those skilled in the art from consideration of the specification. For instance, although aspects and features may in some cases be described in individual figures, it will be appreciated that features from one figure can be combined with features of another figure even though the combination is not explicitly shown or explicitly described as a combination. The methods and system may be implemented as one or more processors configured to execute software, as an application specific integrated circuit (ASIC), or as a logic circuit on a programmable logic device. It is intended that the specification and drawings be considered as examples only, with a true scope of the invention being indicated by the following claims.

What is claimed is:

1. A circuit, comprising:
a logic circuit having a set of inputs;
a first level-sensitive latch having an input connected to a signal path and an output connected to the one of the set of inputs, wherein the first level-sensitive latch is configured to latch a state of a signal on the signal path or operate in a transparent state in response to a state of a configuration memory cell;
a configurable latching circuit having an input connected to an output of the logic circuit configured, in response to a control signal, as a flip-flop in a first mode or as a second level-sensitive latch in a second mode; and
a configurable latch control circuit configured to:
provide a constant value to the clock input of the first level-sensitive latch to maintain the first level-sensitive latch in a transparent state in response to a first state of the configuration memory cell indicating the first mode;
provide an inversion of a pulsed clock signal to a clock input of the first level-sensitive latch in response to a second state of the configuration memory cell indicating the second mode; and
selectively operate the configurable latching circuit in the first mode or second mode, wherein in the second mode, the configurable latch control circuit provides the inversion of the pulsed clock signal to the clock input of the first level-sensitive latch so that the first level-sensitive latch latches the state of the signal on the signal path to remove a hold violation on the signal path.

2. The circuit of claim 1, further comprising a set of level-sensitive latches including the first level-sensitive latch, wherein each of the set of level-sensitive latches has an output connected to a respective one of the set of inputs and an input connected to a respective signal path.

3. The circuit of claim 2, wherein the latch control circuit is configurable to:
for each level-sensitive latch of the set of level-sensitive latches having an input connected to a respective signal path presenting a hold violation, provide the inversion of the pulsed clock signal to a clock input of the level-sensitive latch; and
for each other level-sensitive latch of the set of level-sensitive latches not presenting a hold violation, provide a constant value to a clock input of the level-sensitive latch to maintain the level-sensitive latch in a transparent state.

4. The circuit of claim 1, wherein each cycle of the pulsed clock signal has a first portion having a first value and a second portion having a second value, and wherein a duration of the first portion is less than a duration of the second portion.

5. The circuit of claim 4, wherein a rising edge of the pulsed clock signal is aligned with a rising edge of another clock signal that is used to clock a flip flop in the circuit, and a falling edge of the pulsed clock signal is earlier than a falling edge of the other clock signal.

6. The circuit of claim 1, wherein the configurable latching circuit includes:
a master level-sensitive latch;
a slave level-sensitive latch; and
a multiplexer configured to:
connect the output of the slave level-sensitive latch to an output node of the configurable latching circuit in the second mode, and
connect the output of the master level-sensitive latch to the output node in the first mode.

7. A circuit comprising:
a plurality of configurable routing resources;
a plurality of configurable logic blocks, each configurable logic block including:
a logic circuit having one or more inputs;
for each of the one or more inputs of the logic circuit, a respective level-sensitive latch having an output connected to one of the inputs of the logic circuit and an input connected to the plurality of configurable routing resources, wherein each level-sensitive latch is configured to latch a state of a signal from the configurable routing resources or operate in a transparent state in response to state of a respective configuration memory cell; and
a configurable latching circuit configured, in response to a control signal, as a flip flop in a first mode or as a level-sensitive latch in a second mode;
a configurable latch control circuit configured to:
provide a constant value to the clock input of the respective level-sensitive latch to maintain the respective level-sensitive latch in a transparent state in response to a first state of the respective configuration memory cell indicating the first mode;
provide an inversion of a pulsed clock signal to a clock input of the respective level-sensitive latch in response to a second state of the respective configuration memory cell indicating the second mode; and
selectively operate the configurable latching circuit in the first mode or second mode to remove a hold violation on at least one input of the logic circuit of one of the plurality of configurable logic blocks, wherein in the second mode, the configurable latch control circuit is configured to:
signal the configurable latching circuit of the configurable logic block to operate in the second mode; and
provide an inversion of the pulsed clock signal to the respective level-sensitive latch connected to the at least one input of the logic circuit.

8. The circuit of claim 7, further comprising a configuration circuit configured to, in response to receiving a set of configuration data, program the plurality of configurable routing resources and the plurality of configurable logic blocks to implement a circuit design specified by the set of configuration data.

9. The circuit of claim 8, wherein the configurable latch control circuit is configured to configure the configurable latching circuit and provide the inversion of the pulsed clock signal in response to the set of configuration data.

10. The circuit of claim 8, wherein the configurable latch control circuit is configured to disable latching of each respective level-sensitive latch connected to one of the one or more inputs of the logic circuit that is not subject to a hold violation in response to the set of configuration data.

11. The circuit of claim 7, wherein each cycle of the pulsed clock signal has a first portion having a first value and a second portion having a second value, and a duration of the first portion is less than a duration of the second portion.

12. The circuit of claim 11, wherein a rising edge of the pulsed clock signal is aligned with a rising edge of another clock signal that is used to clock one or more flip flops in the circuit, and a falling edge of the pulsed clock signal is earlier than a falling edge of the other clock signal.

13. The circuit of claim 7, wherein the configurable latching circuit includes:
a master level-sensitive latch;
a slave level-sensitive latch; and
a multiplexer configured to:
connect an output of the slave level-sensitive latch to an output node of the configurable latching circuit in the second mode; and
connect an output of the master level-sensitive latch to the output node in the first mode.

14. A method for placing and routing of a circuit design, comprising:
generating a placed-and-routed circuit design by:
determining a placement for circuit elements of the circuit design, and
determining a set of routes between the circuit elements for connections specified in the circuit design;
evaluating timing of the determined set of routes to identify routes that present a timing violation to a configurable latching circuit in the placed-and-routed circuit design;
in response to identifying a route presenting a timing violation for the configurable latching circuit:
specifying a first state to be programmed in a configuration memory cell of the placed-and-routed circuit design, wherein:
an inversion of a pulsed clock signal is connected to a clock input of a first level-sensitive latch connected to the route in response to the configuration memory cell having the first state, and
a state of a signal on the route is latched in the first level-sensitive latch to remove the timing violation; and
configuring the configurable latching circuit in the placed-and-routed design to operate as a second level-sensitive latch having a clock node connected to receive the pulsed clock signal; and
in response to absence of a timing violation for the configurable latching circuit:
specifying a second state to be programmed in a configuration memory cell of the placed-and-routed circuit design, wherein:
a constant value is connected to a clock input of a first level-sensitive latch connected to the route in response the configuration memory cell having the second state, and
the first level-sensitive latch is maintained in a transparent state; and
configuring the configurable latching circuit in the placed-and-routed design to operate as a flip-flop.

15. The method of claim 14, further comprising generating and storing a set of configuration data from the placed-and-routed circuit design for programming the programmable circuits of the target integrated circuit to implement the placed-and-routed circuit design.

16. The method of claim 15, wherein the storing includes storing the set of configuration data in a non-volatile memory connected to the target integrated circuit.

* * * * *